Nov. 17, 1970  J. K. HUGHES  3,541,197
PRODUCTION OF NET-LIKE STRUCTURES
Filed May 13, 1968

INVENTOR.
J. K. HUGHES
BY
ATTORNEYS

United States Patent Office 3,541,197
Patented Nov. 17, 1970

3,541,197
PRODUCTION OF NET-LIKE STRUCTURES
James K. Hughes, Bartlesville, Okla., assignor to Phillips Petroleum Company, a corporation of Delaware
Filed May 13, 1968, Ser. No. 728,603
Int. Cl. B29b 3/00; B29c 17/14
U.S. Cl. 264—154                              9 Claims

ABSTRACT OF THE DISCLOSURE

Production of net-like structures from uniaxially oriented thermoplastic sheet materials by subjecting the sheet material to localized heating at spaced points which are at an angle with respect to the direction of orientation and fibrillating the sheet to produce a network of fibers between the heated localized areas and form the net-like structure.

BACKGROUND OF THE INVENTION

Figure 1:
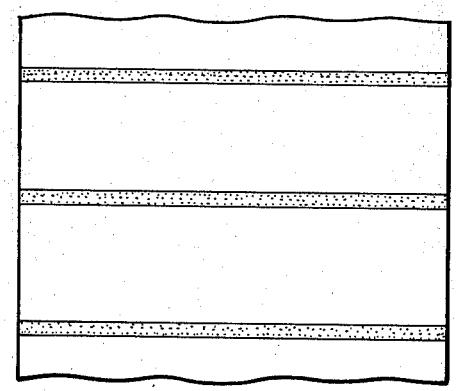

This invention relates to the production of net-like structures or scrim from oriented thermoplastic sheet and film materials. In accordance with a further aspect, the invention relates to a method for producing net-like structures from unixially oriented thermoplastic sheet materials by heating the sheet material at localized areas at desired intervals and at an angle from the direction of orientation and then fibrillating to form a net-like structure. In accordance with a further aspect, this invention relates to the heating of longitudinally oriented thermoplastic film in localized areas at spaced intervals along the length of the film, followed by fibrillation to form a net-like structure.

Films or sheets of thermoplastic materials are formed by melt extrusion using either flat or circular dies, by calendering, by solvent casting, or by other known methods. The resulting sheet or film can be uniaxially oriented by methods well known in the art. Such methods ordinarily produce orientation by controlled stretching and heat setting techniques. Orientation produces desired properties such as tensile strength, increased impact resistance, and the like.

It is further known that a molecular orienting can be imparted to a number of organic synthetic high molecular weight polymers, particularly linear high molecular weight polymers, and also modified or regenerated high molecular weight natural substances can be subjected to a molecular orienting by stretching, which is generally best done while heating to a temperature close to the melting point of the substance, and it is further known that the resulting orienting greatly facilitates the fibrillation of the substance by mechanical or chemical, or both mechanical and chemical, action.

It has been found that if a uniaxially oriented polymeric film or sheet is heated in localized areas to near the melting point of the polymer, the polymer chains in such areas return to the random distribution of the unoriented sheet or film material and upon subjecting the thus heated film or sheet material to fibrillation a net-like structure results from the film fibrillating in the oriented areas with each crack in the fibrillating step stopping at the localized heated areas or fused line. Various patterns of fused lines can be used to produce different structures, as desired.

Accordingly, it is an object of this invention to produce a net-like structure from oriented sheet or film materials.

A further object of this invention is to provide a practical method for producing net-like structures from oriented thermoplastic film or sheet materials.

Other aspects, objects and the several advantages of this invention will be apparent to those skilled in the art upon reading the specification and the appended claims.

SUMMARY OF THE INVENTION

In accordance with the invention, a method is provided for producing a net-like structure from thermoplastic uniaxially oriented sheet materials comprising subjecting localized spaced areas of said sheet material to heating to cause random distribution of the oriented sheet at the localized areas and fibrillating the sheet so as to produce a network of fibers between the heated localized areas and form said net-like structure.

In accordance with one embodiment of the invention, a longitudinally oriented thermoplastic sheet or film is subjected to localized heating at spaced points along the length of the sheet or film to at least partially fuse and cause random distribution of the oriented sheet at the localized area, with the further proviso that the localized area heated extend at an angle with respect to the direction of orientation of the sheet.

In one presently preferred embodiment of the invention, a longitudinally oriented thermoplastic film or sheet is heated at spaced localized areas extending transversely across the sheet by being passed through embossing rolls.

The localized heated oriented sheet material can be fibrillated by subjecting the sheet to mechanical action such as brushing, rolling, rubbing, twisting, grading, impacting, or striking the oriented sheet material to produce the network of fibers between the heated localized areas. The net-like structure results from the film or sheet fibrillating in the oriented areas with the crack in the fibrillating step stopping at the fused lines extending at an angle with respect to the direction of orientation of the sheet material.

DESCRIPTION OF PREFERRED EMBODIMENTS

The film or sheet material oriented, locally heated and fibrillated according to the invention can be any of the well known crystalline polymers. Some of the various crystalline polymers that can be employed include vinylidene chloride polymers; polystyrene; polyethylene; polypropylene; polyamides, such as poly(hexamethyleneadipamide), poly(ethylenesebacamide), poly(methylene bis-p-cyclohexyleneadipamide), polycaprolactam; polyester, such as poly(ethylene teraphthalate), polyacrylonitrile and acrylonitrile copolymers with at least 85 percent acrylonitrile, and many others. Crystalline copolymers can also be used.

The films or sheet materials formed from one or more of the above polymers are oriented by heating to a temperature below the melting point of the particular polymer and stretching the film or sheet. The ratio of the stretched lengths to the original lengths is at least 3 to 1, and is generally in the range of 4 to 1 to 16 to 1. Orientation changes the polymer chain from a random orientation to a more orderly arrangement parallel to the direction of stretch. The films or sheet materials to be treated according to the invention can be stretched either longitudinally or transversely, but in only one direction. It is presently preferred to longitudinally orient thermoplastic film or sheets to be treated according to the invention.

In accordance with the invention, it has been found that if a uniaxially oriented polymeric film is heated in localized areas to the melting point of the polymer, the polymer chains in such areas return to the random distribution of the unoriented film. This heating is best accomplished by a heated bar or heated embossed roll placed against the film surface at desired intervals and at an angle with respect to the direction of orientation. Ordinarily, the heated localized areas are at an angle of from 20 to 90 degrees with respect to the direction of orientation. A suitable embossing roll or heated bar that can be employed for compressing localized heated areas onto the film are illustrated in U.S. Pat. 3,131,425. Generally, it is preferred to use a pair of embossing rolls having mated surfaces.

The spacing of the heated areas along the direction of orientation of the sheet material being treated can vary appreciably. Ordinarily, it is preferred to employ equal spaces between localized heated areas, but it is within the scope of the invention to use varying distances between each heated area. Similarly, they need not be parallel, but could be at varying angles with respect to one another. The important aspect of the invention is to subject the oriented polymeric film to heating in localized areas to the melting point of the polymer so that the polymer chains in such areas return to the random distribution of the unoriented film and that upon subsequent fibrillation, the fibers are interrupted or stop at the fused lines.

Further, in accordance with the invention it has been found that if the film containing both oriented and unoriented areas as prepared above is fibrillated or split by any known method such as the oscillator roll technique, a net-like structure is produced. The net-like structure results from the film fibrillating in the oriented areas with each crack in the fibrillating step stopping at the fused lines. As indicated previously, various patterns of fused lines can be used to produce different structures.

Referring to FIG. 1, there is illustrated an oriented polymeric film wherein the orientation is in the longitudinal direction and extending transversely across the film are a plurality of spaced fused lines.

Figure 2:
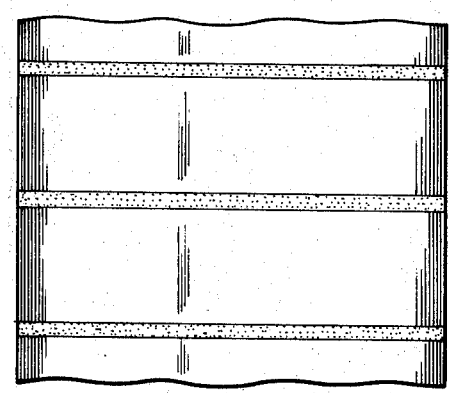

Referring to FIG. 2, the oriented film with the spaced transverse fused lines has been subjected to fibrillation and the cracks or fibers are illustrated between the fused lines.

Figure 3:
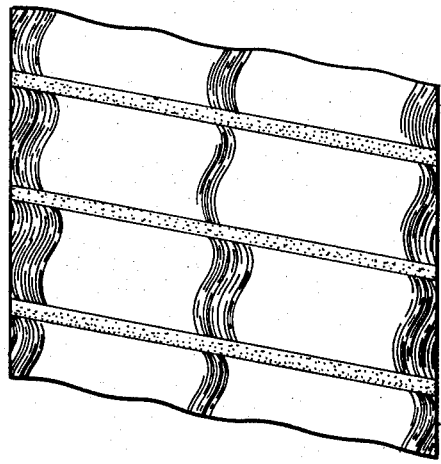

The net-like structure is formed by stretching the material downward from one of the corners to provide a more open structure as illustrated in FIG. 3.

SPECIFIC EXAMPLE

Five samples of oriented polypropylene film drawn 12 to 14 times were heated in selected areas to fusion at 340° F. in bar patterns 1/8 inch wide across the film and at regular intervals on each sample. Intervals of 3/8 inch to 1 inch were used and angles from 30 degrees to 90 degrees to the direction of orientation. Sealing bars faced with Mylar film were used to heat the film samples in selected areas. The film samples were then fibrillated by rubbing the oriented areas between two surfaces with fibrillation taking place between the fused areas. A scrim-like material was formed from all five samples.

I claim:

1. A method for producing a net-like structure from uniaxially oriented thermoplastic sheet material which comprises (a) subjecting localized spaced areas of said sheet material to sufficient heat to at least partially fuse and cause formation of a portion at the localized area substantially consisting of randomly distributed polymer chains, said localized areas extending at an angle to the direction of orientation of the sheet, and (b) fibrillating said sheet so as to produce a network of fibers between said heated localized areas and form said net-like structure.

2. A method according to claim 1 wherein said sheet material is longitudinally oriented.

3. A method according to claim 2 wherein said localized areas are uninterrupted narrow areas extending transversely across the width of said sheet.

4. A method according to claim 3 wherein said localized areas extend at an angle between 20 and 90 degrees with respect to the direction of orientation.

5. A method according to claim 3 wherein the localized areas are heated and partially fused areas are impressed on the sheet material by being passed through a pair of heated mating embossing rolls.

6. A method according to claim 3 wherein said localized areas extending transversely across said sheet material are equally spaced and parallel with one another.

7. A method according to claim 3 wherein said heating is effected with a reciprocating narrow heated bar which contacts the surface of the film at equally spaced points along the length of said film.

8. A process according to claim 3 wherein the sheet material is being moved in a longitudinal direction while being subjected to localized heating transversely to the direction of sheet movement.

9. A method according to claim 3 wherein the thermoplastic material is a uniaxially oriented film formed from a polyolefin.

References Cited

UNITED STATES PATENTS 3,069,726 12/1962 Adams _____ 264—290
3,241,305 3/1966 Irwin _____ 264—168 XR
3,283,378 11/1966 Cramton.
3,320,225 5/1967 Bradbury _____ 264—284 XR
3,444,682 5/1969 Polacco _____ 264—167 XR ROBERT F. WHITE, Primary Examiner R. R. KUCIA, Assistant Examiner U.S. Cl. X.R.

264—145, 147, 160, D1655T

Disclaimer and Dedication 3,541,197.—*James K. Hughes*, Bartlesville, Okla. PRODUCTION OF NET-LIKE STRUCTURES. Patent dated Nov. 17, 1970. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]